United States Patent [19]

Kindt-Larsen et al.

[11] Patent Number: 4,889,664

[45] Date of Patent: Dec. 26, 1989

[54] METHOD OF FORMING SHAPED HYDROGEL ARTICLES INCLUDING CONTACT LENSES

[75] Inventors: Ture Kindt-Larsen, Vedbaek, Denmark; John C. Heaton; Edmund C. Rastrelli, both of Jacksonville, Fla.

[73] Assignee: Vistakon, Inc., Jacksonville, Fla.

[21] Appl. No.: 276,007

[22] Filed: Nov. 25, 1988

[51] Int. Cl.$^4$ .............................................. B29D 11/00
[52] U.S. Cl. ........................................ 264/2.6; 264/41; 264/233; 264/344; 523/106; 523/108; 524/548; 524/558; 524/701; 524/809; 524/850; 524/853
[58] Field of Search ................. 264/2.6, 41, 233, 344; 523/106, 108; 524/548, 558, 701, 809, 850, 853

[56] References Cited

U.S. PATENT DOCUMENTS

| 4,495,313 | 1/1985 | Larsen ........................... 526/195 |
| 4,680,336 | 7/1987 | Larsen et al. ..................... 264/2.1 |

Primary Examiner—James Lowe
Attorney, Agent, or Firm—Charles J. Metz

[57] ABSTRACT

Shaped hydrogel articles such as soft contact lenses are prepared by (1) molding or casting a polymerization mixture comprising: (a) a monomer mixture comprising a major proportion of a hydrophilic (meth)acrylate ester such as 2-hydroxyethyl methacrylate, and a cross-linking monomer; and (b) a water-displaceable diluent, wherein said diluent has a viscosity of at least 100 MPa Sec at 30° C., and wherein said diluent consists essentially of a boric acid ester of certain dihydric alcohols, said dihydric alcohols having Hansen polar ($\delta_p$) and Hansen hydrogen bonding ($\delta_h$) cohesion parameters falling within the area of a circle defined as having a center at $\delta_h = 20.5$, $\delta_p = 13$, and a radius of 8.5, to produce a shaped gel of a copolymer of said monomers and said diluent, and (2) thereafter replacing said diluent with water.

21 Claims, 3 Drawing Sheets

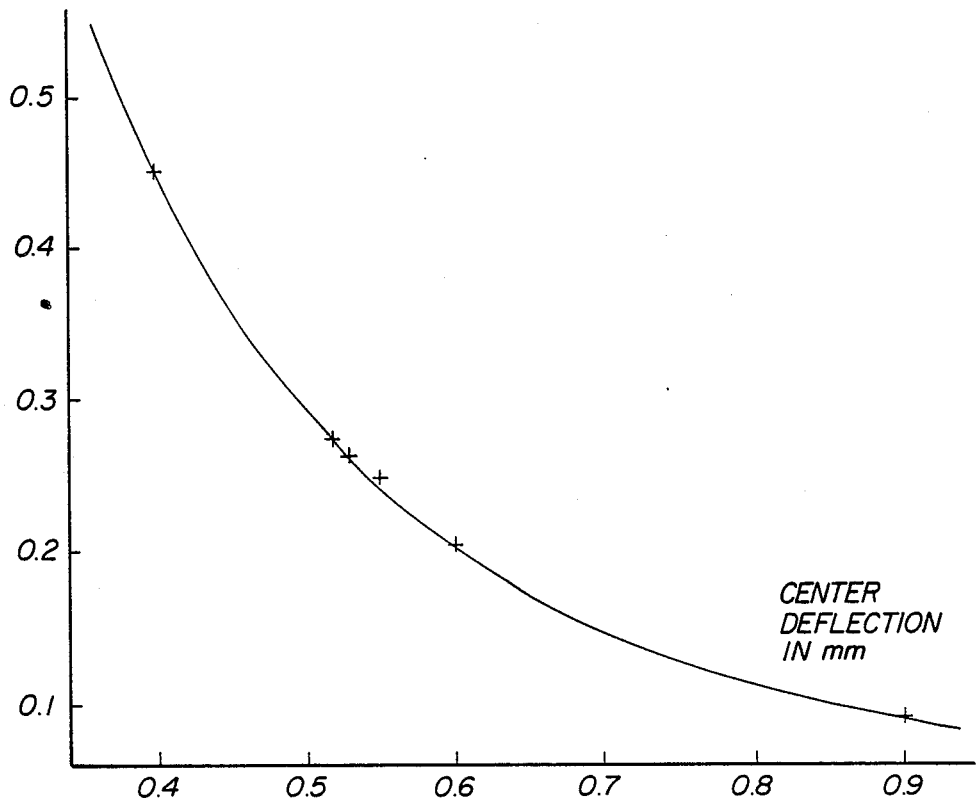
FIG-2 3mm STEELBALL MODULUS "E" MPa. OPTIMEC, 9.8mm ACRYLIC STAND LENS = -1.0D/8.9BC/14.0d/0.15CT
CENTER DEFLECTION IN mm

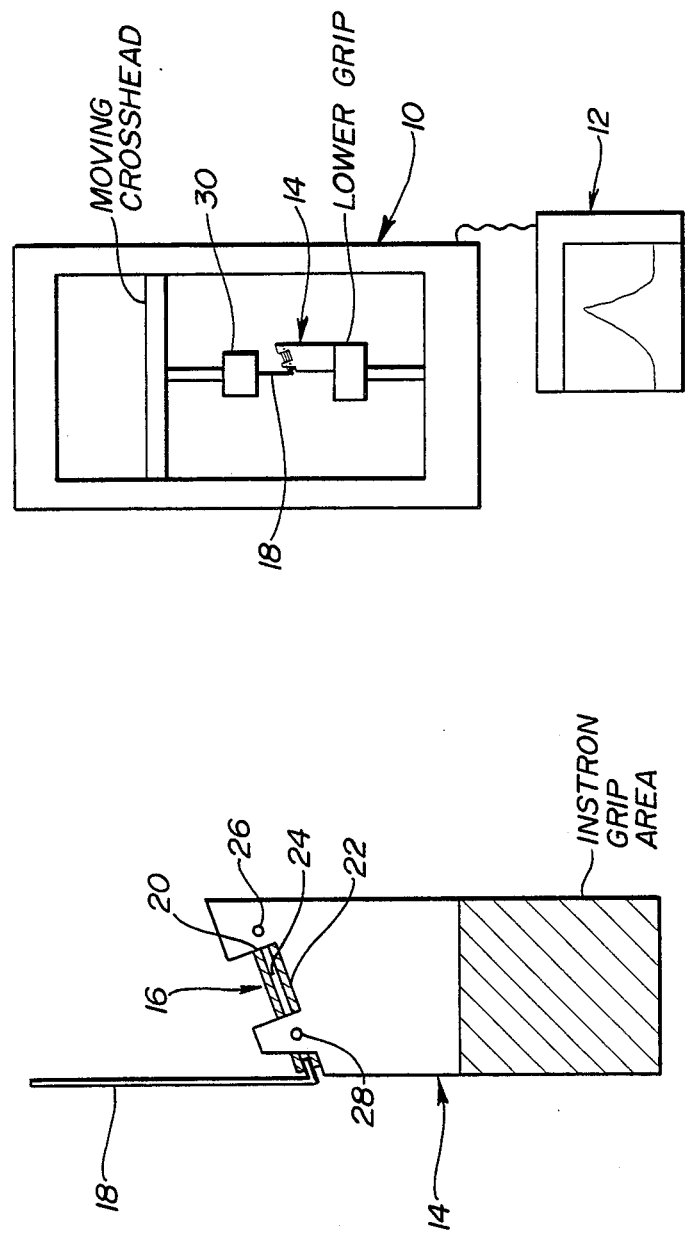

METHOD OF FORMING SHAPED HYDROGEL ARTICLES INCLUDING CONTACT LENSES

The invention relates to the production of shaped hydrogel articles including soft contact lenses, and more particularly to a method for the direct molding of such articles using certain boric acid esters as water-displaceable diluents.

BACKGROUND OF THE INVENTION

Until recently, soft contact lenses of the hydrogel type have been manufactured either by lathe cutting or spin casting. In the lathe cutting method, a lens blank or button of a substantially anhydrous hydrophilic polymer (xerogel) is mechanically cut and polished to a lens shape on a fine lathe, and thereafter is contacted with water or saline to hydrate the polymer and form the desired hydrogel lens. The mechanical steps utilized in the lathe cutting operation are similar to those used in the manufacture of hard contact lenses, except that allowance must be made for swelling of the lens during hydration of the polymer.

In the spin casting method, a small quantity of hydrophilic monomer mixture is placed in a concave, optically polished mold, and the mold is rotated while the monomers are polymerized to form a xerogel lens. The two optical surfaces of the lens are formed simultaneously during polymerization, the outer surface being formed by the concave mold surface and the inner surface being shaped by the joint actions of centrifugal force generated by the rotating mold and surface tension of the polymerization mixture. The lens produced thereby is contacted with water or saline to hydrate the polymer and form a hydrogel lens as in the case of the lathe cut lens.

More recently, an improved process for producing hydrogel contact lenses has been developed, which method is not only more economical than either the lathe cut method or the spin casting method, but it has the advantage of enabling a more precise control over the final shape of the hydrated lens. This new method comprises the direct molding of a monomer mixture wherein said mixture is dissolved in a non-aqueous, water-displaceable solvent, the mixture is placed in a mold having the shape of the final desired hydrogel (i.e., water-swollen) lens, and the monomer/solvent mixture is subjected to conditions whereby the monomer(s) polymerize, to thereby produce a polymer/solvent mixture in the shape of the final desired hydrogel lens. (The polymerization must be carried out in a non-aqueous medium because water inhibits the polymerization reaction.) After the polymerization is complete, the solvent is displaced with water to produce a hydrated lens whose final size and shape are quite similar to the size and shape of the original molded polymer/solvent article. Such direct molding of hydrogel contact lenses is disclosed in Larsen, U.S. Pat. No. 4,495,313 and in Larsen et al., U.S. Pat. No. 4,680,336.

In the Larsen patent, the water-displaceable diluents used are boric acid esters of polyhydric alcohols wherein the polyhydric alcohols have three or more hydroxyl groups. Alternatively, the polyhydric alcohols used may be a mixture of a polyhydric alcohol having three or more hydroxyl groups and a dihydric alcohol. See, for instance, the disclosure at Col. 3, lines 60 et seq. and Col. 4, lines 18–22.

The clear teaching of the Larsen patent is that the polyhydric alcohol used to prepare the borate esters for use in the direct molding process of hydrogel contact lenses must have three or more hydroxyl groups. While it is disclosed that dihydric alcohols can be used in admixture with tri- and higher polyols, the tri- and higher polyols are essential components.

This invention is based on the discovery that esters of boric acid and certain dihydric alcohols (as more fully defined below) can be used as water-displaceable diluents in a direct molding process for making shaped hydrogel articles such as soft contact lenses from polymer mixtures containing as the principal monomer one or more hydrophilic (meth)acrylates such as 2-hydroxyethyl methacrylate ("HEMA"). The invention provides processing advantages in the direct molding process for producing shaped hydrogel articles, including enhanced demoldability (i.e., the ability to open the mold after the polymerization with less force), which results in economic advantages such as a saving of labor costs, and a significant increase in yield because of a reduced proportion of surface defects in the molded articles that would cause rejection. It is believed that the enhanced demoldability and significant improvement in yield is related to the fact that the boric acid esters of diols that are employed in this invention have a lower surface tension than the preferred esters of the Larsen patent, No. 4,495,313, which reduces the adhesion of the polymer/solvent mixture to the mold.

An additional significant advantage that is imparted to the direct molding process by the water-displaceable esters provided by this invention is an enhanced ability to employ hydrophobic monomers (such as UV-absorbing monomers) in the polymerization mixture. When one tries to include hydrophobic monomers such as UV-absorbing monomers in a monomer/diluent mixture using as the diluent the preferred esters of the said Larsen patent, it is found that the hydrophobic monomers are often not soluble in the mixture.

Increasing medical awareness of the adverse affects of ultraviolet ("UV") radiation on the eyes has led to the introduction of spectacles, goggles, contact lenses, and intraocular lenses containing a means to absorb UV radiation. With respect to both contact lenses and intraocular lenses made from polymers (usually acrylic polymers), the preferred means for imparting UV absorbing capability is to make the lens from a copolymer that contains a copolymerized UV-absorbing monomer. Such monomers are disclosed, for example, in Beard et al., U.S. Pat. No. 4,528,311 and Dunks et al., U.S. Pat. No. 4,716,234. It would be desirable to impart UV-absorbing properties to contact lenses made by the direct molding process by including UV-absorbing monomers in the monomer/diluent mixture. This invention makes this desired end practical.

BRIEF SUMMARY OF THE INVENTION

Shaped hydrogel articles such as soft contact lenses are prepared by the steps of:

(1) molding or casting a polymerization mixture comprising:

(a) a monomer mixture comprising a major proportion of one or more hydrophilic (meth)acrylate monomers such as 2-hydroxyethyl methacrylate, and one or more cross-linking monomers; and (b) a water-displaceable diluent, wherein said diluent has a viscosity of at least 100 MPa Sec at 30° C., and wherein said diluent consists essentially of a boric acid ester of certain dihydric alcohols, said dihydric alcohols having Hansen polar $\delta_p$) and Hansen hydrogen bonding ($\delta_h$) cohesion parameters falling within the area of a circle defined as having a center at $\delta_h=20.5$, $\delta_p=13$, and a radius of 8.5, to produce a shaped gel of a copolymer of said monomers and said diluent, and (2) thereafter replacing said diluent with water.

In an important aspect of the invention, soft contact lenses are prepared by the steps of:

(1) molding or casting a polymerization mixture comprising:

(a) a monomer mixture comprising a major proportion of a hydrophilic (meth)acrylate monomer such as 2-hydroxyethyl methacrylate, one or more cross-linking monomers, and a hydrophobic monomer such as a UV-absorbing monomer; and (b) a water-displaceable diluent, wherein said diluent has a viscosity of at least 100 MPa Sec at 30° C., and wherein said diluent consists essentially of a boric acid ester of certain dihydric alcohols, said dihydric alcohols having Hansen polar $\delta_p$) and Hansen hydrogen bonding ($\delta_h$) cohesion parameters falling within the area of a circle defined as having a center at $\delta_h=20.5$, $\delta_p=13$, and a radius of 8.5, to produce a shaped gel of a copolymer of said monomers and said diluent, and (2) thereafter replacing said diluent with water.

THE PRIOR ART

The Larsen patent (No. 4,495,313) cited above is the most relevant prior art known to Applicants.

The Larsen et al. patent, No. 4,680,336, discloses the use in a direct molding process for making hydrogel articles of certain diluents that are selected on the basis of their viscosity and their Hansen polar and hydrogen bonding cohesion parameters.

Other U.S. patents relating to the direct molding of hydrogel articles such as soft contact lenses include Larsen, U.S. Pat. Nos. 4,565,348 and 4,640,489, Ohkada et al., 4,347,198, Shepard, 4,208,364, and Wichterle et al., Re. 27,401 (3,220,960).

BRIEF DESCRIPTION OF THE DRAWINGS

FIG. 2 is a calibration graph used in the determination of the Young's modulus of soft contact lenses; and FIG. 3 is a side view, partially schematic, of the test fixture and assembly used to determine the force required to open the molds in which contact lenses comprising polymer/diluent mixtures were produced.

DETAILED DESCRIPTION OF THE INVENTION

Figure 1:
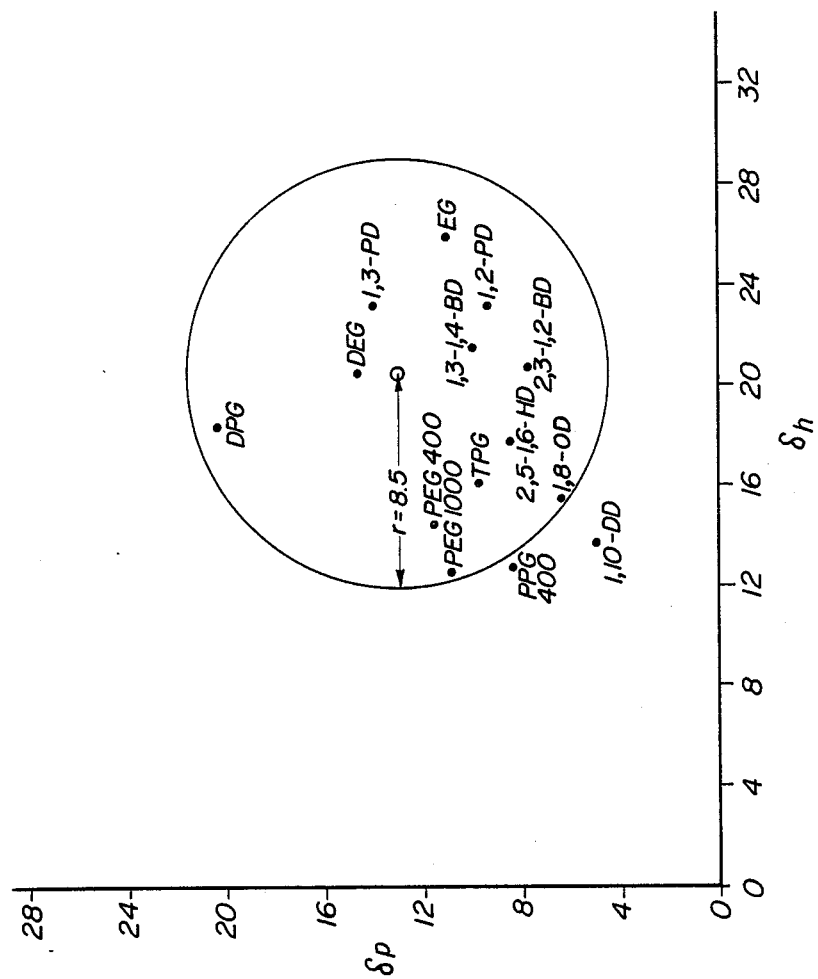
FIG. 1 is a plot of the Hansen cohesion parameters, $\delta_h$ and $\delta_p$, for several dihydric alcohols.

The boric acid esters are esters that are used in the invention as water-displaceable diluents in the direct molding of hydrogel articles comprise borate esters of certain dihydric alcohols, said dihydric alcohols having Hansen polar ($\delta_p$) and Hansen hydrogen bonding ($\delta_h$) cohesion parameters falling within the area of a circle defined as having a center at $\delta_h=20.5$, $\delta_p=13$, and a radius of 8.5. It is also required that the ester of boric acid and the dihydroxy compound have a viscosity of at least 100 MPa Sec at 30° C., and preferably at least about 500 MPa sec at 30° C.

The boric acid esters are prepared by procedures analogous to those that are known in the art, as by reacting boric acid with the dihydric alcohol (for brevity, dihydric alcohols will occasionally be referred to herein as "diols") and removing the water formed by the reaction by normal procedures such as by vacuum distillation. The reaction of boric acid with the dihydric alcohol is carried out at a temperature and for a period of time sufficient to form the ester. Typical reaction temperatures are usually found within the range of from about 50° to about 120° C. At these temperatures, reaction times of from about two to about twelve hours are typical. In any event, the reaction is continued until the water content of the ester is less than about 2%, by weight. The proportion of boric acid to dihydric alcohol is selected so that the viscosity of the ester is at least 100 MPa Sec at 30° C. The examples, below, give representative proportions of boric acid to dihydric alcohol that have been found to give the desired viscosity in the ester product. In certain cases, it may be desirable to include a small proportion of a monohydric alcohol in the esterification reaction mixture to control the molecular weight of the ester product.

The dihydric alcohols used in preparing the water-displaceable borate ester diluents used in the invention are those having Hansen polar ($\delta_p$) and Hansen hydrogen bonding ($\delta_h$) cohesion parameters falling within the area of a circle defined as having a center at $\delta_h=20.5$, $\delta_p=13$, and a radius of 8.5. The Hansen cohesion parameter $\delta$ is usually expressed in terms of three components ($\delta_h$, $\delta_p$, $\delta_d$) where $\delta_h$ is the hydrogen bonding cohesion parameter, $\delta_p$ is the polar cohesion parameter, and $\delta_d$ is the dispersion cohesion parameter. It has been found that for the purposes of this invention the dispersion cohesion parameters of the dihydric alcohols are substantially the same (the values that have been determined vary between about 15.7 and 17.0), and therefore have little effect in determining the suitability of any particular dihydric alcohol for use in the invention. The consideration of the Hansen cohesion parameters for the dihydric alcohol used in making the borate ester diluent is accordingly reduced to a two-dimensional function on the basis of polar and hydrogen bonding cohesion parameters.

Hansen cohesion parameters are known in the art. Reference is made to "CRC Handbook of Solubility Parameters and Other Cohesion Parameters", by Allan F. M. Barton, CRC Press, Inc., Boca Raton, Fla. (1983), especially pages 85–87, 141, and 153–164, Hansen, "THE UNIVERSALITY OF THE SOLUBILITY PARAMETER", I&EC Product Research and Development, Vol. 8, No. 1, March 1969, pages 2–11, Wernick, "Stereographic Display of Three-Dimensional Solubility Parameter Correlations", Ind. Eng. Chem. Prod. Res. Dev., Vol. 23, No. 2, 1984, pages 240–245, and Kirk-Othmer Encyclopedia of Chemical Technology, 2nd ed., Suppl. Vol., Interscience, NY 1971, pages 891 and 892, for illustrative discussions of the Hansen cohesion parameters and how to determine them.

The Hansen cohesion parameters, $\delta_h$ and $\delta_p$, for selected polyhydric alcohols are displayed in Table I, below. The Hansen and Beerbower data as reported in the CRC Handbook were used when available. For diols that were not listed, the values were calculated from group contributions using the Hansen and Beerbower data as shown in the CRC Handbook, pp. 85–87 and Kirk-Othmer, pp. 891–892. The values for $\delta_p$ were calculated by the simple additive method as suggested in Kirk-Othmer.

TABLE I
HANSEN PARAMETERS OF DIHYDRIC ALCOHOLS

| DIOL | ABBREVIATION | $\delta_p$ | $\delta_h$ |
|---|---|---|---|
| ETHYLENE GLYCOL | EG | 11.0 | 26.0 |
| 1,2-PROPANEDIOL | 1,2-PD | 9.4 | 23.3 |
| 1,3-PROPANEDIOL | 1,3-PD | 14.0 | 23.2 |
| 1,2-BUTANEDIOL | 1,2-BD | 7.7 | 20.8 |
| 1,3-BUTANEDIOL | 1,3-BD | 10.0 | 21.5 |
| 1,4-BUTANEDIOL | 1,4-BD | 10.0 | 21.5 |
| 2,3-BUTANEDIOL | 2,3-BD | 7.7 | 20.8 |
| 1,6-HEXANEDIOL | 1,6-HD | 8.4 | 17.8 |
| 2,5-HEXANEDIOL | 2,5-HD | 8.4 | 17.8 |
| 1,8-OCTANEDIOL | 1,8-OD | 6.3 | 15.5 |
| 1,10-DECANEDIOL | 1,10-DD | 5.0 | 13.8 |
| DIETHYLENE GLYCOL | DEG | 14.7 | 20.5 |
| POLYETHYLENE GLYCOL (400 mw) | PEG 400 | 11.6 | 14.5 |
| POLYETHYLENE GLYCOL (1000 mw) | PEG 1000 | 10.9 | 12.6 |
| DIPROPYLENE GLYCOL | DPG | 20.3 | 18.4 |
| TRIPROPYLENE GLYCOL | TPG | 9.8 | 16.1 |
| POLYPROPYLENE GLYCOL (400 mw) | PPG 400 | 8.3 | 12.9 |

The data presented in Table I is displayed as a plot of $\delta_h$ versus $\delta_p$ in FIG. 1.

The monomer mixture used in the process of the invention contains a hydrophilic monomer such as HEMA as the major component, one or more cross-linking monomers, and optionally small amounts of other monomers such as methacrylic acid. HEMA is the preferred hydrophilic monomer. Other hydrophilic monomers that can be employed include 2-hydroxyethyl acrylate, 2-hydroxypropyl methacrylate, 2-hydroxypropyl acrylate, 3-hydroxypropyl methacrylate, N-vinyl pyrrolidone, glycerol mono-methacrylate, glycerol mono-acrylate, and the like. The cross-linking monomers that can be employed, either singly or in combination, include ethylene glycol dimethacrylate, trimethylolpropane trimethacrylate, glycerol trimethacrylate, polyethylene glycol dimethacrylate (wherein the polyethylene glycol has a molecular weight up to, e.g., about 400), and other polyacrylate and polymethacrylate esters. The cross-linking monomer is used in the usual amounts, e.g., from about 0.1 to about 3, and preferably in amounts of from about 0.2 to about 2, parts by weight per 100 parts by weight of HEMA or other hydrophilic monomer. Other monomers that can be used include methacrylic acid, which is used to influence the amount of water that the hydrogel will absorb at equilibrium. Methacrylic acid is usually employed in amounts of from about 0.2 to about 8 parts, by weight, per 100 parts of HEMA. Other monomers that can be present in the polymerization mixture include methoxyethyl methacrylate, acrylic acid, and the like.

As was mentioned above, one of the features of the invention is that hydrophobic monomers may be included in the monomer mixture without encountering incompatibility problems to the degree that such problems are encountered with prior art methods of polymerizing HEMA-based copolymers. Illustrative of such hydrophobic monomers are the UV-absorbing monomers such as benzotriazole (meth)acrylate esters, for instance, the 2-[2'-hydroxy-5'-acryloyloxyalkylphenyl]-2H-benzotriazoles disclosed by Beard et al. in U.S. Pat. No. 4,528,311, the 2-[2'-hydroxy-5'-acryloyloxy-alkoxyphenyl]-2H-benzotriazoles disclosed by Dunks et al. in U.S. Pat. No. 4,716,234, and the 2-(2'-hydroxyphenyl)-5(6)-(acryloylalkoxy)benzotriazoles disclosed by Dunks et al. in U.S. patent application Ser. No. 21,096, filed on Mar. 3, 1987, and assigned to an affiliate of the assignee of this application. Specific illustrative benzotriazole UV-absorbing (meth)acrylate esters that can be used in the invention include the following compounds:

2-(2'-hydroxy-5'-methacryloxyethylphenyl)-2H-benzotriazole;

2-(2'-hydroxy-5'-methacryloxyethylphenyl)-5-chloro-2H-benzotriazole;

2-(2'-hydroxy-5'-methacryloxypropylphenyl)-5-chloro-2H-benzotriazole;

2-(2'-hydroxy-5'-methacryloxypropyl-3'-tert-butylphenyl)-2H-benzotriazole;

2-(2'-hydroxy-5'-methacryloxypropyl-3'-tert-butylphenyl)-5-chloro-2H-benzotriazole;

2-[2'-hydroxy-5'-(2-methacryloyloxyethoxy)-3'-tert-butylphenyl]-5-methoxy-2H-benzotriazole;

2-[2'-hydroxy-5'-(gamma-methacryloyloxypropoxy)-3'-tert-butylphenyl]-5-methoxy-2H-benzotriazole; and 2-(3'-t-butyl-2'-hydroxy-5'-methoxyphenyl)-5-(3'-methacryloyloxypropoxy)benzotriazole.

Other hydrophobic monomers that can be included in the polymerization reaction mixture for various purposes include benzophenone derivatives, long chain alkyl (meth)acrylates, such as n-dodecyl methacrylate, stearyl methacrylate, n-octyl methacrylate, n-dodecyl acrylate, and the like.

The benzotriazole UV-absorbing (meth)acrylate esters are used in the monomer mixture in an amount effective to absorb UV radiation in the finished lens product. Usually, the proportion of the UV-absorbing monomer will be within the range of from about 1 to about 10 parts by weight per 100 parts by weight of the major hydrophilic monomer(s) such as HEMA.

A polymerization catalyst is included in the monomer mixture. The polymerization catalyst can be a free radical generating compound such as lauroyl peroxide, benzoyl peroxide, isopropyl percarbonate, azobisisobutyronitrile, or the like, that generate free radicals at moderately elevated temperatures, or the polymerization catalyst can be a photoinitiator system such as an aromatic alpha-hydroxy ketone or a tertiary amine plus a diketone. Illustrative examples of photoinitiator systems are 4-(2-hydroxyethoxy)phenyl 2-hydroxy-2-propyl ketone and a combination of camphorquinone and ethyl 4-(N,N-dimethylamino)benzoate. The catalyst is used in the polymerization reaction mixture in catalytically effective amounts, e.g., from about 0.1 to about 2 parts by weight per 100 parts of HEMA.

The examples set forth below illustrate the practice of the invention.

EXAMPLE 1

Illustrative molding procedure

Contact lenses are molded from the following polymerization reaction mixture:

| Component | Parts, by Weight |
|---|---|
| HEMA | 100.0 |
| Methacrylic acid | 2.00 |
| Ethylene glycol dimethacrylate | 0.4 |
| Darocure 1173[1] | 0.35 |
| 1,4-butanediol Boric Acid Ester[2] | 102.75 |

[1] 4-(2-hydroxyethoxy)phenyl 2-hydroxy-2-propyl ketone
[2] Produced by reacting 797 parts, by weight, of 1,4-butanediol with 203 parts, by weight, of boric acid at a temperature of 90° C. for 4 hours under 750 mm Hg vacuum.

The polymerization reaction mixture is placed in transparent polystyrene molds of the type described in Larsen, U.S. Pat. No. 4,640,489 (see, especially, FIG. 2 of the Larsen patent), and is exposed on one side of the Polystyrene mold to 1.7 Joules/cm$^2$ of ultraviolet radiation for 6 to 12 minutes (the exact exposure time is not narrowly critical).

EXAMPLE 2

Illustrative monomer/diluent recipe for UV-absorbing lens

Using conditions analogous to those described above in Example 1, contact lenses are molded from the following polymerization reaction mixture:

| Component | Parts, by Weight |
|---|---|
| HEMA | 100.00 |
| Methacrylic acid | 2.04 |
| Ethylene glycol dimethacrylate | 0.4 |
| 2-(2'hydroxy-5'-methacryloxypropyl-3'-t-butylphenyl)-5-chloro-2H—benzotriazole | 3.00 |
| Camphorquinone | 0.40 |
| Ethyl 4-(N,N—dimethylamino)benzoate | 0.60 |
| 1,4-butanediol Boric Acid Ester[1] | 77.45 |

[1] Produced by reacting 797 parts, by weight, of 1,4-butanediol with 203 parts, by weight, of boric acid at a temperature of 90° C. for 4 hours under a vacuum of 750 mm Hg.

EXAMPLE 3

A series of esters of boric acid and dihydric alcohols were made by the following general procedure:

The boric acid and dihydric alcohol were charged to a 1-liter rotating evaporator and gradually heated to 90° C. (the time to achieve 90° C. was about 1 hour), while applying mild vacuum (100 torr). When 90° C. was reached, a full vacuum (10 torr) was applied and the reaction was continued for 3 hours at 90° C. After cooling, water content was determined by Karl Fischer titration and the viscosity of the borate ester at 30° C. was determined by a Brookfield LVF viscometer (6, 12, and 30 rpm).

The borate esters that were prepared in accordance with the foregoing general procedure are identified in Table II, below. The table identifies the diols used, using the abbreviations mentioned in Table I, and one triol, glycerol ("gly"), that was used as a control, the mols of each component (alcohol and boric acid) and the molar ratio of the alcohol to boric acid reactants used to Prepare each ester, the viscosity at 30° C. (in mPa Sec), and the per cent of water in the ester. A column for comments is also included in the table.

TABLE II

| Run | Alcohol | For 1000 gms of Reactants Acid Mols | For 1000 gms of Reactants Alc Mols | Molar ratio, alc to acid | Water cont., % | Visc., mPa sec 30° C. | Comments |
|---|---|---|---|---|---|---|---|
| 1 | EG | 3.75 | 12.38 | 3.30 | 0.5 | Paste | |
| 2 | EG | 4.36 | 11.77 | 2.70 | 1.7 | solid | (1) |
| 3 | 1,2-PD | 3.91 | 9.97 | 2.55 | 0.3 | 85 | |
| 4 | 1,2-PD | 5.03 | 9.05 | 1.80 | 0.7 | 200 | |
| 5 | 1,2-PD | 5.68 | 8.52 | 1.50 | 1.4 | 632 | (2) |
| 6 | 1,3-PD | 3.45 | 10.34 | 3.00 | 0.7 | 38 | |
| 7 | 1,3-PD | 5.68 | 8.52 | 1.50 | 1.4 | 40 | |
| 8 | 1,2-BD | 3.28 | 8.85 | 2.70 | 0.2 | 50 | |
| 9 | 1,2-BD | 5.08 | 7.61 | 1.5 | 1.1 | 100 | (2) |
| 10 | 1,3-BD | 5.08 | 7.61 | 1.50 | 1.0 | 100 | |
| 11 | 1,4-BD | 3.01 | 9.03 | 3.00 | 1.8 | 1200 | |
| 12 | 1,4-BD | 3.28 | 8.85 | 2.70 | 1.4 | 14000 | |
| 13 | 2,3-BD | 3.28 | 8.85 | 2.70 | 0 | 48 | |
| 14 | 2,3-BD | 5.08 | 7.61 | 1.50 | 1.1 | 50 | (2) |
| 15 | 1,6-HD | 2.63 | 7.09 | 2.70 | 0.3 | 27250 | (3) |
| 16 | 2,5-HD | 2.40 | 7.21 | 3.00 | 0.4 | 15200 | (3) |
| 17 | 2,5-HD | 2.63 | 7.09 | 2.70 | 0.4 | 100000+ | (2),(3) |
| 18 | 1,8-OD | 2.09 | 5.96 | 2.85 | 0.3 | solid | (1),(3) |
| 19 | 1,10-DD | 1.88 | 5.07 | 2.70 | 0.3 | solid | (4) |
| 20 | GLY | 4.06 | 8.13 | 2.00 | 0.6–1 | 18–22000 | |
| 21 | DEG | 2.87 | 7.75 | 2.7 | 1.3 | 870 | |
| 22 | PEG 400 | 0.88 | 2.36 | 2.70 | 0.7 | 590 | |
| 23 | PEG 1000 | 0.362 | 0.978 | 2.70 | 0.7 | Solid | (1) |
| 24 | DPG | 2.36 | 6.37 | 2.70 | 1.3 | 2360 | |
| 25 | DPG | 2.75 | 6.19 | 2.25 | 1.5 | 100000+ | |
| 26 | TPG | 1.72 | 4.65 | 2.70 | 0.9 | 1000 | |
| 27 | PPG 400 | 1.04 | 2.34 | 2.25 | 0.9 | 900 | (4) |

(1) Diluent solid, but useable when mixed with monomers.
(2) Boric acid crystals formed when mixed with water.
(3) Not completely compatible with water (in a mixture of part ester to 10 parts water, by weight), but can be used because it is displaceable after a wash with ethanol or a mixture of ethanol and water.
(4) Not compatible with either water or monomer mixture (1:1 monomer:diluent, by weight); cannot be used.

Many of the borate esters identified above in Table II were evaluated as water-displaceable diluents with the following monomer formulation:

| Component | Parts, by Weight |
|---|---|
| HEMA | 100.0 |
| Methacrylic acid | 2.0 |
| Ethylene glycol dimethacrylate | 0.4 |
| Darocure 1173 | 0.35 |
| Diluent | 102.75 |

This monomer formulation, which contains 0.4 part of cross-linking monomer, was selected for evaluation because the Young's modulus values of the hydrogels prepared from this formulation can be correlated well with expected performance in the contact lens application. It has been found that if the Young's modulus of a hydrogel prepared using this formulation (which includes 0.4 part of a polyfunctional cross-linking monomer) is at least about 0.10–0.12 MPa, then a hydrogel prepared from a similar formulation, which may contain a slightly higher proportion of cross-linking monomer, can be expected to be strong enough for use as a soft contact lens. In conventional commercial practice, the amount of polyfunctional cross-linking monomer(s) such as ethylene glycol dimethacrylate and trimethylolpropane trimethacrylate is normally from about 0.2–1.0 part in a formulation similar to that used in this Example.

Soft contact lenses were prepared from the monomer/diluent mixtures set forth above in transparent polystyrene molds as described above in Example 1. The monomer/diluent mixture in each mold was exposed on one side to about 1.7 Joules/cm$^2$ of ultraviolet radiation for 10 minutes at 55° C. (TL09 lamps, with peak radiation at 350 nm).

The lenses prepared from the diluent/monomer mixtures were evaluated for:

(1) Appearance of lens, both in the mold and after demolding; and (2) Young's modulus of the hydrated lens; and
(3) Force required to demold the molded lenses.

The results of these evaluations are displayed in Tables III and IV, below. Table III displays the Run No., the dihydric alcohol used to make the borate ester diluent, lens appearance (C=clear, W=white, OS=opaque surface, SO=slightly opaque), and the Young's modulus "E", in MPa. Table IV displays the force required to demold the molded lenses at three different temperatures.

TABLE III

EVALUATION OF MOLDED LENSES

| Ester No | Alcohol | Appearance Mold | Final | E | Comments |
|---|---|---|---|---|---|
| 1 | EG | C | C | .20 | |
| 2 | EG | C | C | .23 | |
| 3 | 1,2-PD | C | C | .11 | |
| 4 | 1,2-PD | C | C | .18 | |
| 5 | 1,2-PD | C | C/OS | .17 | (1) |
| 7 | 1,3-PD | — | C/OS | — | (2) |
| 8 | 1,2-BD | C | C | .25 | |
| 9 | 1,2-BD | OS | — | — | (2) |
| 10 | 1,3-BD | OS | — | — | (2) |
| 11 | 1,4-BD | C | C | .24 | |
| 13 | 2,3-BD | C | C | .08 | |
| 14 | 2,3-BD | OS | — | — | (2) |
| 15 | 1,6-HD | C | C | .19 | |
| 16 | 2,5-HD | C | C | .19 | |
| 18 | 1,8-OD | C | SO | .21 | |
| 20 | GLY | C | C | .25 | (control) |
| 21 | DEG | C | C | .29 | |
| 22 | PEG 400 | C | C | .34 | |
| 23 | PEG 1000 | C | C | .30 | |
| 24 | DPG | C | C | .28 | |
| 25 | DPG | C | C | .27 | |
| 26 | TPG | C | C | .27 | |
| 27 | PPG 400 | W | W | — | |

(1) Dissolved the polystyrene mold slightly which caused a slightly opaque surface.
(2) Dissolved the polystyrene mold; could not be demolded.

Modulus test

The Young's modulus values of the lenses displayed in Table III were determined by the following procedure:

Scope

This test is useful for comparative non-destructive modulus testing of lenses of almost identical physical dimensions. The test has been calibrated against similar lenses tested in an accurate test as described in Larsen et al., U.S. Pat. No. 4,680,336 (column 9–10).

Lenses

The lenses useful in this test are a −1.0 diopter, 8.9+/−0.3 mm BC (base curve), 0.15+/−0.01 mm center thickness, 14.0+/−0.5 mm diameter.

Test

The lens dimensions are measured and, if within the specification, the lens is placed on top of a transparent acrylic cylinder (13 mm outer diameter, 9.8 mm inner diameter, 7.2 mm height) so that the lens front curve rests against the inner (9.8 mm diameter) top surface of the acrylic cylinder. The set-up is immersed in 0.9% saline in the center thickness-measuring chamber of an Optimec JCF/R/SI Contact Lens Analyzer. The cylinder and lens are centered so that the lens is in a horizontal position, and the center thickness scale is adjusted so that it can measure deflection on the center of the front curve surface.

A 3 mm stainless steel ball (weight 0.2584 gram) is carefully placed on the concave side of the lens. The central part of the lens will deflect depending on the modulus of the lens. The deflection is read in mm on the center thickness scale, and the modulus can be determined from the calibration graph, FIG. 2.

A minimum of 3 lenses from the same batch are being tested, and the deflection of each lens is measured 3 times. The modulus is the average of at least 9 measurements.

TABLE IV

Demold Force

| Ester No. | Diol | Demold Force (lbs) 30° C. | 55° C. | 80° C. |
|---|---|---|---|---|
| 1 | EG | 6.49 (1.11) | 5.15 | 4.76 (1.08) |
| 2 | EG | (1) | N/A (2) | 6.15 (0.54) |
| 3 | 1,2-PD | 3.94 (0.43) | 2.87 (0.52) | 2.73 (0.52) |
| 4 | 1,2-PD | 4.53 (0.32) | 3.20 (0.42) | 3.26 (0.75) |
| 5 | 1,2-PD | 1.46 (0.77) | 1.99 (0.87) | 2.39 (1.03) |
| 6 | 1,3-PD | 3.95 (0.38) | 3.11 (0.63) | 2.68 (0.25) |
| 7 | 1,3-PD | (3) | (3) | (3) |
| 10 | 1,3-BD | (3) | (3) | (3) |
| 11 | 1,4-BD | 4.99 (0.63) | 4.51 (0.47) | 3.44 (0.53) |
| 12 | 1,4-BD | 5.70 (0.33) | 3.91 (0.91) | 3.50 (0.31) |
| 20 | GLY | (1) | (1) | (1) |
| 21 | DEG | 2.81 (0.66) | 2.42 (0.71) | 1.56 (0.64) |
| 22 | PEG 400 | 3.39 (0.36) | 2.76 (0.51) | 1.36 (0.43) |
| 23 | PEG 1000 | 3.47 (1.01) | 3.53 (0.57) | 3.03 (0.71) |
| 24 | DPG | 0.86 (0.49) | 1.08 (0.41) | 1.18 (0.18) |
| 25 | DPG | 0.92 (0.21) | 0.76 (0.32) | 1.11 (0.52) |
| 26 | TPG | 1.75 (0.57) | 1.76 (0.61) | 2.18 (0.35) |
| 27 | TPG | (4) | (4) | (4) |

The numbers in parentheses are standard deviations.
(1) The flange on the top half of the mold broke during force measurement.
(2) Data not available
(3) Not possible to demold. The polymer/diluent mixture dissolved the mold and bonded the two halves of the mold together.
(4) Demold force too low to measure.

Demold test

The test employed to evaluate the force required to open the mold in which the polymer/diluent mixtures were produced, the results of which are displayed in Table IV, is as follows:

Scope

This test is useful for quantifying the minimum force required to separate the front and back halves of the mold (as described in Larsen, U.S. Pat. No. 4,640,489) which are bound together by a polymer matrix containing some known level of diluent. The mold dimensions should remain constant for all samples analyzed.

Instrumentation

The test fixture and assembly used to measure the forces to open the molds is shown in FIG. 3. The instrument used for measuring the force is a laboratory tensile testing apparatus 10, such as an Instron model #1122. A 50 lb load cell (not shown) is used with the chart recorder 12 being set at 20 lbs full scale.

The temperature is controlled by a heat gun (not shown), such as a Varitemp heat gun (Model VT-750A) connected to a Staco type 3PN2210 rheostat. A T-type thermocouple (not shown) inserted in the polymer/diluent mixture is used to measure the temperature of the polymer/diluent mixture.

A fixture 14 holds the specimen 16 in place during the test and a lever 18 is used to pull the top half 20 of the mold away from the bottom half 22.

Test Procedure

The specimen is comprised of the top 20 and bottom 22 halves of the mold 16, which are bound together by the polymer/diluent matrix 24. The specimens for testing are freshly Produced filled molds of constant dimensions. The molds are placed in a dessicator immediately after polymerization so as to prevent moisture from being absorbed by the polymer or the diluent.

The specimen to be tested is placed in the sample holder as shown in FIG. 3. The sample fixture is held by the lower grip of the Instron with a pressure of 36 PSI. The entire specimen is situated at a 20° angle to the horizontal plane when placed in the fixture. The bottom half 22 of the mold is kept in place during the test by inserting four pins (only two are shown, in cross-section) 26, 28 around the circumference of the bottom half 22 of the mold at 90° intervals.

The lever 18 used to pull the top half 20 away from the bottom half 22 is positioned between the two halves and is held in place by the upper grip 30 of the Instron. The rate at which the lever pulls the top half is controlled by the cross-head speed of the Instron.

The air flow of the heat gun is directed directly at the top half of the mold to maintain consistent heating. The temperature of the air flow can be controlled with the rheostat.

The sample temperature is monitored by inserting a thermocouple in such a way as to measure the change in temperature of the polymer/diluent matrix 24. When the thermocouple measures the desired temperature, the cross-head of the Instron is raised at a speed of 1 inch/min. The force to demold was measured at 30°, 55°, and 80° C.

The force required to break the adhesion of the polymer/diluent to the top half 20 as a function of time if recorded by the chart recorder of the Instron. From this recording, the minimum demold force is determined.

From the data presented above, it can be seen that only those esters made from diols falling within the defined Hansen parameter area give transparent lenses (which is essential for the contact lens application), and only those having viscosities greater than 100 MPa sec have modulus values high enough to be strong enough to be used in the contact lens application.

The demold data clearly demonstrate that the diol esters of this invention give much easier demoldability (less force needed to demold) than do the preferred esters of the Larsen patent, No. 4,495,313.

As an illustration of the yield improvement that can be obtained by employing the diol-borate esters of this invention in place of a glycerol-borate ester, the number of surface flaws was determined on three batches of 80 lenses from each of monomer/ester mixtures, using a formulation analogous to that set forth above in Example 1. When the diluent used was a diethylene glycol/boric acid ester (ester No. 21 in Table II), the percentage of surface defects was found to be 10.4%, when the diluent was a 1,4-butanediol/boric acid ester (ester No. 12 in Table II), the percentage of surface defects was found to be 13.0%, and when the diluent was a glycerol/boric acid ester (ester No. 20 in Table II), the percentage of surface defects was found to be 30.4%. This is a valuable improvement over the process taught in the Larsen patent, No. 4,495,313.

What is claimed is:

1. Process for producing shaped hydrogel articles which comprises the steps of:
   (1) molding or casting a polymerization mixture comprising:
      (a) a monomer mixture comprising a major proportion of a hydrophilic (meth)acrylate ester monomer and a cross-linking monomer; and
      (b) a water-displaceable diluent, wherein said diluent has a viscosity of at least 100 MPa Sec at 30° C., and wherein said diluent consists essentially of a boric acid ester of certain dihydric alcohols, said dihydric alcohols having Hansen polar ($\delta_p$) and Hansen hydrogen bonding ($\delta_h$) cohesion parameters falling within the area of a circle defined as having a center at $\delta_h=20.5$, $\delta_p=13$, and a radius of 8.5, to produce a shaped gel of a copolymer of said monomers and said diluent, and
   (2) thereafter replacing said diluent with water.

2. The process of claim 1 wherein the said hydrophilic monomer is a hydroxyalkyl (meth)acrylate.

3. The process of claim 2 wherein the hydroxyalkyl (meth)acrylate is 2-hydroxyethyl methacrylate.

4. The process of claim 1 wherein said diluent has a viscosity of at least 500 MPa Sec at 30° C.

5. The process of claim 1 wherein said dihydric alcohol is selected from the group consisting of ethylene glycol, 1,2-propanediol, 1,4-butanediol, 1,6-hexanediol, 2,5-hexanediol, 1,8-octanediol, diethylene glycol, triethylene glycol, tetraethylene glycol, polyethylene glycol having a molecular weight of up to about 2000, dipropylene glycol, and tripropylene glycol.

6. The process of claim 4 wherein said dihydric alcohol is selected from the group consisting of 1,4-butanediol, 1,6-hexanediol, 2,5-hexanediol, diethylene glycol, triethylene glycol, tetraethylene glycol, polyethylene glycol having a molecular weight of up to about 1000, dipropylene glycol, and tripropylene glycol.

7. The process of claim 1 wherein said dihydric alcohol is 1,4-butanediol.

8. The process of claim 1 wherein said dihydric alcohol is diethylene glycol.

9. The process of claim 1 wherein the monomer mixture contains methacrylic acid.

10. The process of claim 1 wherein the shaped hydrogel article is a contact lens.

11. The process for producing contact lenses which comprises the steps of:
   (1) molding or casting a polymerization mixture comprising:
      (a) a monomer mixture comprising a major proportion of a hydrophilic (meth)acrylate ester, a cross-linking monomer, and a hydrophobic monomer; and
      (b) a water-displaceable diluent, wherein said diluent has a viscosity of at least 100 MPa Sec at 30° C., and wherein said diluent consists essentially of a boric acid ester of certain dihydric alcohols, said dihydric alcohols having Hansen polar ($\delta_p$) and Hansen hydrogen bonding ($\delta_h$) cohesion parameters falling within the area of a circle defined as having a center at $\delta_h=20.5$, $\delta_p=13$, and a radius of 8.5, to produce a shaped gel of a copolymer of said monomers and said diluent, and
   (2) thereafter replacing said diluent with water.

12. The process of claim 11 wherein the said hydrophilic monomer is a hydroxyalkyl (meth)acrylate.

13. The process of claim 12 wherein the hydroxyalkyl (meth)acrylate is 2-hydroxyethyl methacrylate.

14. The process of claim 11 wherein said diluent has a viscosity of at least 500 MPa Sec at 30° C.

15. The process of claim 11 wherein said dihydric alcohol is selected from the group consisting of ethylene glycol, 1,2-propanediol, 1,4butanediol, 1,6-hexanediol, 2,5-hexanediol, 1,8-octanediol, diethylene glycol, triethylene glycol, tetraethylene glycol, polyethylene glycol having a molecular weight of up to about 2000, dipropylene glycol, and tripropylene glycol.

16. The process of claim 14 wherein said dihydric alcohol is selected from the group consisting of 1,4-butanediol, 1,6-hexanediol, 2,5-hexanediol, diethylene glycol, triethylene glycol, tetraethylene glycol, polyethylene glycol having a molecular weight of up to about 1000, dipropylene glycol, and tripropylene glycol.

17. The process of claim 11 wherein said dihydric alcohol is 1,4-butanediol.

18. The process of claim 11 wherein said dihydric alcohol is diethylene glycol.

19. The process of claim 11 wherein the monomer mixture contains methacrylic acid.

20. The process of claim 11 wherein the hydrophobic monomer is a benzotriazole ester.

21. The process of claim 20 wherein the benzotriazole ester is 2-(2'-hydroxy-5'-methacryloxypropyl-3'-tert-butylphenyl)-5-chloro-2H-benzotriazole.

* * * * *